(12) United States Patent
Vorwald et al.

(10) Patent No.: US 9,340,284 B2
(45) Date of Patent: May 17, 2016

(54) CARGO SUSPENSION FRAME FOR AIRCRAFT

(75) Inventors: John G. Vorwald, Germantown, MD (US); Scott A. Sirchio, Mount Airy, MD (US); Frank A. Leban, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1297 days.

(21) Appl. No.: 12/855,722

(22) Filed: Aug. 13, 2010

(65) Prior Publication Data

US 2012/0037759 A1    Feb. 16, 2012

(51) Int. Cl.
*B64D 1/22*    (2006.01)

(52) U.S. Cl.
CPC ........................................ *B64D 1/22* (2013.01)

(58) Field of Classification Search
CPC ............ B64D 9/00; B64D 1/12; B64D 9/003; B64D 1/22; B64D 9/03
USPC .................. 244/137.1, 118.1, 137.4
See application file for complete search history.

(56) References Cited

U.S. PATENT DOCUMENTS

| 3,044,818 | A | | 7/1962 | Tobey |
| 3,265,336 | A | | 8/1966 | Peterson |
| 3,450,376 | A | | 6/1969 | Rusanovich et al. |
| 3,554,468 | A | | 1/1971 | McVicar |
| 4,346,862 | A | | 8/1982 | Richburg |
| 4,378,919 | A | | 4/1983 | Smith |
| 4,609,168 | A | * | 9/1986 | Dean et al. ................. 244/137.4 |
| 5,344,203 | A | * | 9/1994 | Tollenaere .................. 294/68.1 |
| 5,465,925 | A | | 11/1995 | Connolly et al. |
| 5,499,785 | A | | 3/1996 | Roberts et al. |
| 5,788,186 | A | | 8/1998 | White |
| 6,533,220 | B2 | | 3/2003 | Schuster |
| 6,986,484 | B2 | | 1/2006 | Scott |

* cited by examiner

*Primary Examiner* — Valentina Xavier
(74) *Attorney, Agent, or Firm* — Richard Morgan; Dave Ghatt

(57) ABSTRACT

The bottom surface of an aircraft, such as an Osprey V-22 propeller driven aircraft, has at least four distributed hook attachment points. A load suspension apparatus is attached to the four attachment points with elongated slings. The load suspension apparatus includes an upper rigid frame and a lower rigid frame of lesser dimensions. The lower frame is suspended from the upper frame with V-shaped slings. A cargo load is attached to the lower frame. The load suspension apparatus provides stable attachment of loads to tilt wing and rotary wing aircraft at high aircraft speeds, at transitions between high and low speeds and through aircraft turns.

13 Claims, 2 Drawing Sheets

CARGO SUSPENSION FRAME FOR AIRCRAFT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to aeronautics. More particularly, the invention relates to aircraft structure and load accommodation. The invention also relates to cargo loading or discharging, particularly releasable, externally mounted cargo.

2. Discussion of the Related Art

Suspension slings are used for suspending a cargo load below an aircraft during flight. Loads are typically attached to a helicopter with a sling suspension attached to structurally strengthened hard points on the under surface of the fuselage. There is substantial benefit when jettisoning load for suspension from a single cable. Dropping or jettisoning cargo is inherently more balanced because it is accomplished by opening a single attachment hook. However, a single cable system produces an undistributed point load on the aircraft resulting in instability problems. At speeds greater than low speeds, a load will twist on a single cable to a position broadside to the direction of flight. Flight with the widest area facing the direction of flight induces yawing of the load. As a result, the pilot must limit aircraft speed to approximately 50 knots to reduce instability in the aircraft.

In order to overcome the single cable load yawing, loads have been suspended from two or more cables. It has been found that this reduces aerodynamically induced load yawing at lower speeds but yawing resumes at higher speeds. Two or more suspension cables are used for low speed flight but produce instability at higher speeds of 120 knots or more. Aircraft turns may initiate instability at any aircraft speed, especially at higher speeds.

In order to use the capability speed of aircraft, there a need for an attachment apparatus that provides stable suspension of externally mounted cargo loads at higher air speeds.

SUMMARY OF THE INVENTION

An aircraft is configured with four or more structurally strengthened hard points for engagement of hard point attachment means. Elongated attachment slings attach the cargo suspension apparatus to the hard point attachment means.

The cargo suspension apparatus comprises an upper rigid frame and a lower rigid frame. The lower frame is geometrically similar and dimensionally smaller that the upper frame.

V-shaped slings connect the upper frame with the lower frame and suspend the lower frame therebelow. The lower frame has load attachment means. A load, such as a cargo receiving holder, is attached to the lower rigid frame.

BRIEF DESCRIPTION OF THE DRAWINGS

A more complete appreciation of the invention and many of its attendant advantages will be readily appreciated as it becomes better understood by reference to the following detailed description when considered in connection with the accompanying drawing wherein.

DETAILED DESCRIPTION OF THE INVENTION

Figure 1:
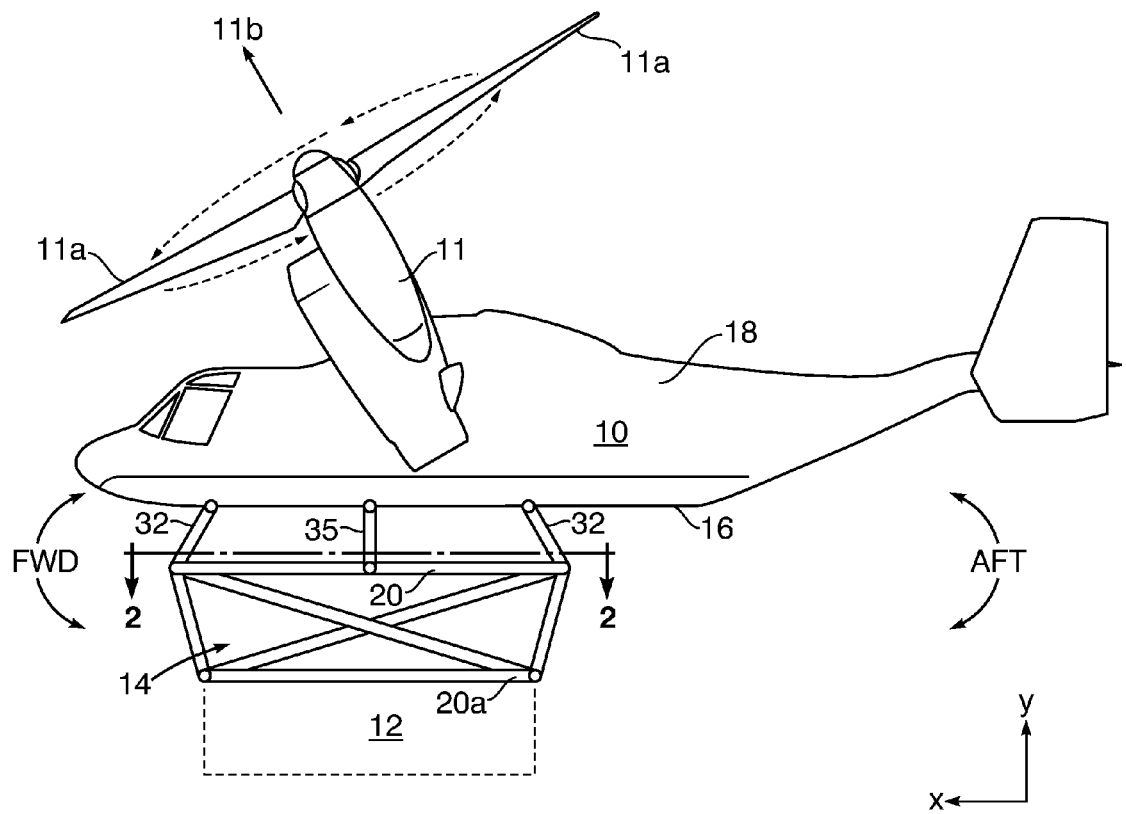
FIG. 1 is a side elevated view of an aircraft in flight with a cargo suspension apparatus and suspended cargo according to the invention.

The invention is described with reference to the drawing wherein numerals in the written description correspond to like-numbered elements in the figures. The drawing discloses a preferred embodiment of the invention and is not intended to limit the generally broad scope of the invention as set forth in the claims.

Figure 3:
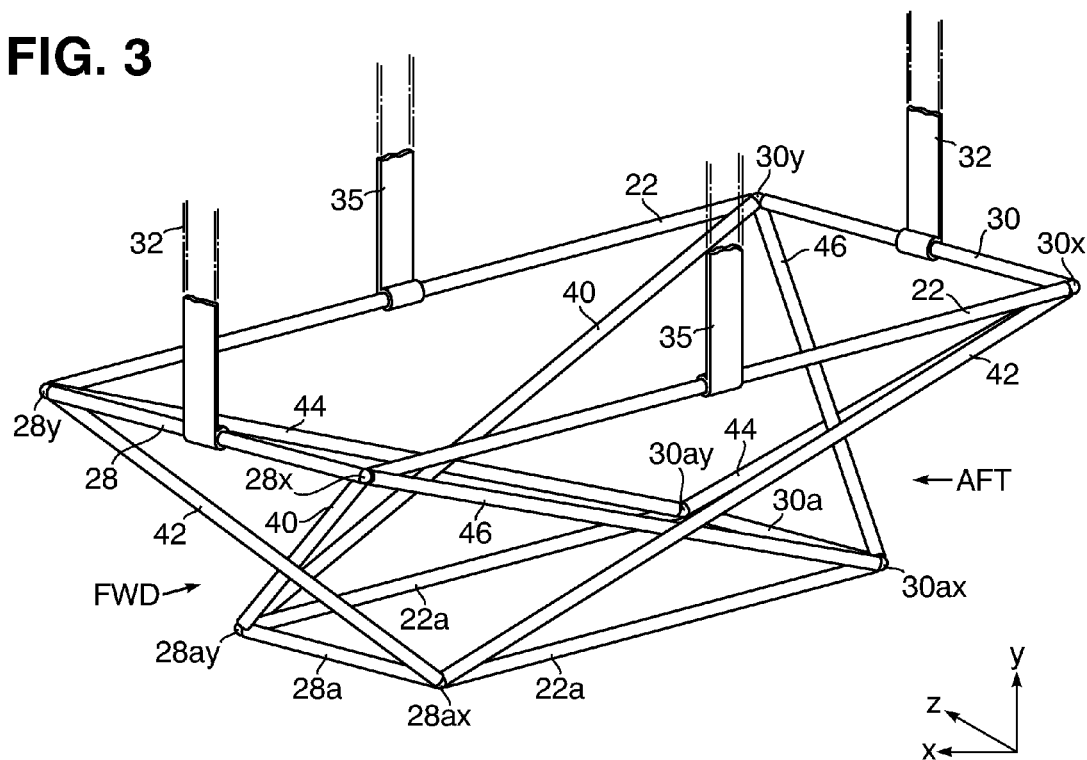
FIG. 3 is a partial perspective view of the cargo suspension apparatus separated from the aircraft shown in FIG. 1.

Reference is made to FIG. 1 in which the horizontal and vertical axes are labeled x and y. This is a side view so the z-axis is not seen in this view as it is seen in FIG. 3. An Osprey V-22 tilt rotor aircraft 10 is in transition from vertical flight to horizontal flight. Transition is accomplished by means of aircraft engine 11 which drives propellers 11a and is tilted to provide propulsion in a direction indicated by arrow 11b. Arrow 11b includes components along both the horizontal x-axis and the vertical y-axis. Forward is labeled FWD and aft is labeled AFT on aircraft 10. The forward and aft labeling also extends to the load suspension apparatus 14 and to the load 12.

The reported suspended cargo carrying capacity for the Osprey V-22 is 10,000 to 15,000 pounds. An external cargo load suspended beneath a tilt rotor aircraft or a helicopter is susceptible to aerodynamic instability. This instability can be transmitted through the cargo suspension apparatus to the aircraft. The cargo suspension apparatus of the invention allows for aerodynamic movement of the cargo and compensation for that movement with V-shaped slings. Dynamic moments are opposed and compensated in the suspension apparatus with reduced transmission of dynamic moments to the aircraft.

Packaged cargo load 12 is suspended from aircraft 10 by a load suspension apparatus 14 attached to the underside 16 of the aircraft fuselage 18. Load suspension apparatus 14 is joined to aircraft 10 by means of aircraft attachment slings 32 and 35. The Osprey V-22 aircraft is exemplary of an aircraft that is sensitive to destabilizing by a suspended cargo load and therefore benefits from use of the cargo suspension frame of the invention. The invention was discovered while investigating stable suspension systems for the Osprey V-22 tilt rotor aircraft and its use with this aircraft is the Best Mode contemplated by the inventors. Because of the enhanced load stability, use with an aircraft such as a helicopter will also enhance load stability.

Military aircraft ordinarily have structurally strengthened hard points in the airframe or attached to the airframe for the attachment of external loads and for ground and shipboard tie down. A hard point can be configured to mount a hook for releasable fastening of a cargo cable, cargo net, cargo sling and the like. Helicopters and the V-22 Osprey aircraft have structurally strengthened hard points spaced forward and aft on the underside of the fuselage. The invention requires at least four spaced, structurally strengthened hard points. The V-22 Osprey has tie-down points attached to the airframe on the underside of the fuselage. These tie-down points are structurally strengthened hard points and are useful for attachment of the cargo suspension apparatus of the invention. Helicopters also have similar tie-down points.

Figure 2:
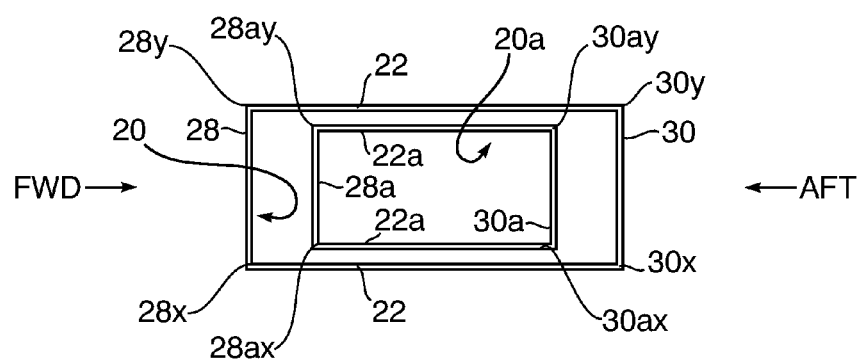
FIG. 2 is a partial overhead sectional view as seen from section line 2-2 in FIG. 1.

In FIG. 2, load suspension apparatus 14 has an upper rigid frame 20 of rectangular configuration shown horizontally positioned just below the fuselage underside 16. Also associated with the load suspension apparatus 14 is a lower rigid frame 20a of a similar rectangular geometrical configuration but of smaller dimensions. A lower rigid frame 20a is shown positioned horizontally below the upper rigid frame 20. Frame 20 and frame 20a share the general forward (FWD) and aft (AFT) orientation of aircraft 10. The forward end is defined by forward end bar 28 and forward end bar 28a. The aft end is defined by aft end bar 30 and aft end bar 30a.

Upper rigid frame 20 is formed from a pair of parallel spaced side bars 22 connected by a forward end bar 28 and an aft end bar 30. The side bars 22 are attached to forward end bar 28 at attachment point 28x and at opposing attachment point 28y. The side bars 22 are attached to aft end bar 30 at attachment point 30x and at opposing attachment point 30y.

Lower rigid frame 20a is formed from a pair of parallel spaced side bars 22a connected by a forward end bar 28a and an aft end bar 30a. The lower side bars 22a are attached to forward end bar 28a at attachment point 28ax and at opposing attachment point 28ay. The side bars 22a are attached to aft end bar 30a at attachment point 30ax and at opposing attachment point 30ay.

In FIG. 2 it is clear that frame 20 and frame 20a are geometrically similar. Frame 20a has smaller dimensions. Smaller dimensions means that side bars 22a are shorter than side bars 22. In the alternative smaller dimensions means that forward end bar 28a and aft end bar 30a are shorter than forward end bar 28 and aft end bar 30. In another alternative, smaller dimensions means that each of 22a, 28a and 30a is shorter than the corresponding 22, 28 and 30 as shown in FIG. 2. The lower frame 22a forms the top of a cargo holder within which the load 12 is contained as shown in FIG. 1.

The V-22 Osprey aircraft external fuselage length is about 57.33 feet and width is about 84.6 feet. Typical dimensions for the load suspension frame of the invention for use with this aircraft are as follows:
 a. Side bar 22 is 18 to 22 feet
 b. Side bar 22a is 16 feet (for a howitzer or Humvee high mobility multipurpose vehicle)
 c. Side bar 22a is 20 feet (for a cargo container)
 d. Forward end bar 28 is 8 to 10 feet
 e. Forward end bar 28a is 6 to 8 feet
 f. Aft end bar 30 is 8 to 10 feet
 g. Aft end bar 30a is 6 to 8 feet
 h. Preferred ratio of side bar 22:forward end bar 28 is 2.1:1
 i. Preferred ratio of side bar 22:side bar 22a is 1.1:1
 j. Preferred ratio of forward end bar 28:forward end bar 28a is 1.1:1
 k. Distance between frame 20 and frame 20a is 4 to 6 feet
 l. Distance between frame 20 and aircraft underside 16 is 2 to 4 feet
 m. Distance between forward and aft attachment points on aircraft is 26 to 27 feet
 n. Distance between lateral attachment points on aircraft is
  7 to 8 feet (forward)
  11 to 12 feet (aft)

Dimensions for use with another aircraft are scaled according to the dimensions of the available hard points.

A cargo holder may be attached to lower frame 20a. In the alternative, lower frame 20a may be integrally connected with a cargo container. In another alternative, an aerodynamically irregularly shaped load such a vehicle can be attached to lower frame 20a with cargo straps. The optimum stability of the cargo suspension frame is achieved by limiting cargo load to dimensions less than the dimensions of the aircraft structurally strengthened hard points.

Materials of construction for cargo suspension frames is well known in the industry. Aircraft aluminum or aerospace aluminum usually refers to 7075 aluminum, a zinc and copper alloy. Aircraft aluminum also includes 6061 aluminum 6063 aluminum, 2024 aluminum and 5052 aluminum. Frames are made of aircraft specification aluminum alloy brackets or tubing. The bracket or tubing material is selected to carry the weight lifted with an allowance for safety.

Figure 4:
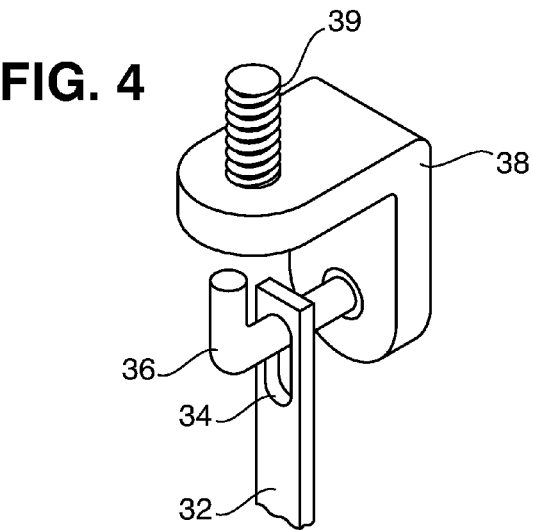
FIG. 4 is a partial view of an attachment arrangement associated with the cargo suspension apparatus shown in FIG. 1.

In FIG. 3, three orthogonal axes are labeled x, y and z. These axes are consistent with the axes shown in FIG. 1 and consistent with the forward (FWD) and aft (AFT) labeling. In FIG. 3 and FIG. 4, an elongated aircraft attachment sling 32 is mounted on the forward and aft frame end bars 28 and 30. Elongated aircraft sling 32 has a slot 34 at the upper end for reception of a hook 36 attached to a hard point on the underside 16 of aircraft 10. Elongated aircraft slings 35 are also mounted on the frame side bars 22. Each of the elongated aircraft slings 35 has a slot 34 formed in the upper end thereof for reception of a hook 36 on hook attachment bracket 38 connected by a bolt 39 to a hard point on the fuselage underside 16. Attached to the aircraft frame are four spaced structurally strengthened hard points on the fuselage underside 16, including hook attachment brackets 38, respectively attached to the aircraft 10 for suspension of frame 20 from the fuselage underside 16 at four locations established by the elongated aircraft slings 32 and 35.

As described above, the suspension apparatus 14 includes a lower rigid frame 20a of a similar rectangular geometrical configuration as the upper frame 20 but of smaller dimension. That is, the corresponding members of the rectangle are shorter. Lower rigid frame 20a includes forward end bar 28a, aft end bar 30a and two side bars 22a. Upper rigid frame 20 includes forward end bar 28, aft end bar 30 and two side bars 22.

The term V-shaped sling means a sling having three attachment points The three attachment points correspond with the three vertexes of a triangle. Sling material usually comprises only two legs of a triangle. A third leg, as seen in FIG. 3 need not be present. Although the third leg is not present, the slings may be referred to as triangulated slings. Because of the three attachment points, the visual impression is of a V-shaped or triangulated sling. In the alternative, the V-shaped sling can include the three legs of a triangle.

V-shaped slings 40, 42, 44 and 46 are attached at a forward end to one of two corner attachment points on the upper frame 20 and at an aft end to a diagonal corner attachment point on the upper frame. The V-shaped sling is also attached at an intermediate point to the lower frame at one of two points. One point is on the same end and the opposing side on the lower frame. The other intermediate point on the lower frame is on the opposite end and non-opposing side.

The lower frame 22a is suspended from the upper frame 20 by a minimum of four flexible V-shaped slings. The V-shaped slings are connected as follows:

(a.) V-shaped sling 40 is attached at a forward end to attachment point 28x, at an intermediate point to attachment point 28ay and at an aft end to attachment point 30y.

(b.) V-shaped sling 42 is attached at a forward end to attachment point 28y, at an intermediate point to attachment point 28ax and at an aft end to attachment point 30x.

(c.) V-shaped sling 44 is attached at a forward end to attachment point 28y, at an intermediate point to attachment point 30ay and at an aft end to attachment point 30x.

(d.) V-shaped sling 46 is attached at a forward end to attachment point 28x, at an intermediate point to attachment point 30ax and at an aft end to attachment point 30y.

Each attachment point on the upper frame is connected to its diagonal attachment point on the upper frame with two V-shaped slings. Each of the two V-shaped slings transits the load suspension apparatus 14 differently. One transit by the sling is by diagonal intermediate attachment at the same end to the opposing attachment point on the lower frame end bar. The other transit is by intermediate attachment at the opposite end to the non-opposing attachment point on the lower frame end bar. Both transits form a diagonal from the upper frame to the lower frame. The result is a series of diagonal crossings between the upper frame and the lower frame. The diagonal crossings form triangles. The crossed V-shaped slings dynamically stabilize suspended loads from lateral forces in all lateral directions. Inverted V-shaped slings are functionally equivalent.

By virtue of the foregoing described light weight arrangement of the load suspension device 14, increased restraint and stability is provided for the cargo load 12. The upper rectangular frame 20 enables use of distributed structurally strengthened hard points for suspension by the aircraft attachment slings 32 and 35 from the fuselage underside 16, while the attachments of the V-shaped slings 40, 42, 44 and 46 at the opposite frame ends 24 and 26 provides for enhanced stabilized suspension of the load 12 therebelow. Furthermore, the configuration of the load suspension apparatus 14 allows for normal operation of the aircraft 10 when no load is attached. Also, the sling attachments including hook 36 and attachment bracket 38 on the aircraft underside allow jettisoned release of the suspension slings.

Materials of construction of aircraft cargo slings are well known in the industry. Slings are made of nylon and polyester web material in widths of 1 inch to 12 inches, typically 1 inch to 6 inches. The slings have strength in the range of 7500 lb/inch to 9800 lb/inch (MIL-W-4088/MIL-W-27265). Materials are sold under trade names including Nomex®, Vectran®, Cordura®, Kevlar® and Spectra®. In the alternative, aircraft attachment slings 32 and 35 and V-shaped slings 40, 42, 44 and 46 may be made from conventional aircraft cargo slings, cables or ropes.

Means for attaching cargo slings to aluminum frames are well known and commercially available. The structurally strengthened hard points on the aircraft are equipped with releasable cargo hooks for air drop of a load. Hooks are attached to the elongated aircraft attachment slings through a slot in the cargo sling. The slot is reinforced with sewing to form an eyelet. The slot may further be reinforced with metal or plastic inserts. The term hard point attachment means is intended to include hooks and all functional equivalents such as clips, eyelets and the like.

The aircraft attachment slings and the V-shaped slings are fabricated by a sewing to form a sewn connection loop. Other connectors including buckles, latches, and swiveling connectors are available for use with cargo slings.

According to other embodiments of the invention, the rectangular configuration of the upper and lower frames 20 and 20a may be replaced, for example, by circular, elliptical or greater than four-sided polygonal configurations.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A load suspension apparatus for suspension of a load from an aircraft having at least four structurally strengthened hard points, each hard point having a hard point attachment means, the load suspension apparatus comprising:
   (a.) a plurality of at least four aircraft attachment slings, each sling attached at an upper end to a hard point attachment means and at a lower end to a rigid upper frame;
   (b.) the rigid upper frame;
   (c.) a rigid lower frame, geometrically similar and dimensionally smaller than the upper frame;
   (d.) elongated V-shaped slings connecting the upper frame with the lower frame and suspending the lower frame therebelow; and
   (e.) a load connected to the lower frame.

2. The apparatus of claim 1 wherein:
   the upper and lower frames are rectangular and have four corners to which the elongated V-shaped slings are attached.

3. The apparatus of claim 1 wherein:
   upper and lower frames are rectangular and have four corners to which elongated v-shaped slings are attached, and
   crossing V-shaped slings connect corners of the rectangular upper and lower frames.

4. The apparatus of claim 1 wherein each elongated V-shaped sling has:
   two ends, each end attached to one frame, and
   an intermediate point attached to another frame.

5. The apparatus of claim 1 wherein:
   each elongated V-shaped sling has two ends, each end attached to one frame, and an intermediate point attached to another frame, and
   each V-shaped sling crosses two other V-shaped slings.

6. The apparatus of claim 1 wherein:
   the upper and lower frames are rectangular and have four corners to which elongated V-shaped slings are attached,
   each elongated V-shaped sling has two ends, each end attached to opposing corners of one frame,
   each elongated V-shaped sling has an intermediate point attached to another frame corner, and
   each V-shaped sling crosses two other V-shaped slings.

7. The apparatus of claim 1 wherein:
   each elongated v-shaped sling has two ends, each end attached to one frame and has an intermediate point attached to another frame, and
   each elongated V-shaped sling crosses two other v-shaped slings, first forward or aft relative to the frames and second laterally relative to the frames.

8. The apparatus of claim 1 wherein:
   the plurality of aircraft attachment slings is four in number,
   the rigid upper frame is rectangular in configuration, and
   the aircraft attachment slings are attached at intermediate points, distanced from corners on the rigid upper frame.

9. A load suspension apparatus for suspension of a load from an aircraft having at least four structurally strengthened hard points, each hard point having a hard point attachment means, the load suspension apparatus comprising:
   (a.) a rigid upper quadrilateral frame, having a forward member, an aft member, and opposing first lateral member and second lateral member, the lateral members connecting the two ends of the forward member at first and second forward attachment points with ends of the aft member at corresponding first and second aft attachment points;

(b.) a rigid lower frame, geometrically similar to and dimensionally smaller than the upper frame and having a forward member, an aft member, and opposing first lateral member and second lateral member, the lateral members connecting the two ends of the forward member at first and second forward attachment points with ends of the aft member at corresponding first and second aft attachment points;

(c.) a plurality of at least four aircraft attachment slings attached at one end to the upper frame, each of the aircraft attachment slings having a second end capable of attachment to the hard point attachment means;

(d.) elongated V-shaped slings connecting the upper frame with the lower frame and suspending the lower frame therebelow; each elongated V-shaped sling:
  (i.) attached at a first end to a forward attachment point on the upper frame,
  (ii.) attached at an intermediate point to an opposing forward attachment point on the lower frame and
  (iii.) attached at a second end to an opposing aft attachment point on the upper frame;

(e.) a load connected to the lower frame.

10. The apparatus of claim 9 wherein: the upper and lower frames are rectangular and have
  four corners at which the elongated V-shaped slings are attached.

11. The apparatus of claim 9 wherein:
  upper and lower frames are rectangular and have four corners at which the elongated V-shaped slings are attached, and
  the V-shaped slings are assembled with four crossing V-shaped slings extending between corners of the rectangular upper and lower frames.

12. The apparatus of claim 9 wherein:
  the plurality of aircraft attachment slings is four in number.

13. The apparatus of claim 9 wherein:
  the upper and lower frames are rectangular and have four corners, and
  the elongated v-shaped slings are formed by pairs of crossing slings extending between corners of the upper and lower frames.

* * * * *